US 12,423,408 B1

(12) United States Patent
Blasco et al.

(10) Patent No.: US 12,423,408 B1
(45) Date of Patent: Sep. 23, 2025

(54) SYSTEMS AND METHODS FOR OPTIMIZING AUTHENTICATION BRANCH INSTRUCTIONS

(71) Applicant: Apple Inc., Cupertino, CA (US)

(72) Inventors: Conrado Blasco, Sunnyvale, CA (US); Ian D. Kountanis, Santa Clara, CA (US); Douglas C. Holman, San Jose, CA (US); Sean M. Reynolds, Cupertino, CA (US); Richard F. Russo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 17/934,143

(22) Filed: Sep. 21, 2022

Related U.S. Application Data

(63) Continuation of application No. 15/484,439, filed on Apr. 11, 2017, now Pat. No. 11,468,168.

(51) Int. Cl.
*G06F 21/52* (2013.01)
*G06F 21/56* (2013.01)

(52) U.S. Cl.
CPC ............ *G06F 21/52* (2013.01); *G06F 21/565* (2013.01); *G06F 21/566* (2013.01); *G06F 2221/034* (2013.01)

(58) Field of Classification Search
CPC .. G06F 9/3005–30058; G06F 9/30181–30192; G06F 9/34–3557; G06F 21/52–55; G06F 21/554; G06F 21/56; G06F 21/562; G06F 21/565; G06F 21/566; G06F 21/567; G06F 21/57; G06F 2212/1052; G06F 2212/452; G06F 2221/033; G06F 2221/034

See application file for complete search history.

(56) References Cited

U.S. PATENT DOCUMENTS

| 7,644,258 | B2 | 1/2010 | Glew |
| 9,063,721 | B2 | 6/2015 | Ghose |
| 9,244,689 | B2 | 1/2016 | Chheda et al. |
| 10,409,600 | B1 | 9/2019 | Sierra et al. |
| 11,468,168 | B1 | 10/2022 | Blasco et al. |

(Continued)

OTHER PUBLICATIONS

"Instruction set architecture" Wikipedia: The Free Encyclopedia. Wikimedia Foundation, Inc. Last Edited: Mar. 6, 2020, https://en.wikipedia.org/wiki/Instruction_set_architecture (Year: 2020).

(Continued)

*Primary Examiner* — Kevin Bechtel
(74) *Attorney, Agent, or Firm* — Robert C. Kowert; Kowert, Hood, Munyon, Rankin & Goetzel, P.C.

(57) ABSTRACT

Systems, apparatuses, and methods for efficient handling of subroutine epilogues. When an indirect control transfer instruction corresponding to a procedure return for a subroutine is identified, the return address and a signature are retrieved from one or more of a return address stack and the memory stack. An authenticator generates a signature based on at least a portion of the retrieved return address. While the signature is being generated, instruction processing speculatively continues. No instructions are permitted to commit yet. The generated signature is later compared to a copy of the signature generated earlier during the corresponding procedure call. A mismatch causes an exception.

20 Claims, 8 Drawing Sheets

(56) References Cited

U.S. PATENT DOCUMENTS

| | | |
|---|---|---|
| 2014/0082327 A1 | 3/2014 | Ghose |
| 2016/0170769 A1* | 6/2016 | LeMay ............... G06F 9/30054 |
| | | 713/190 |
| 2016/0171211 A1* | 6/2016 | Chen ....................... G06F 21/54 |
| | | 726/23 |
| 2016/0363624 A1 | 12/2016 | Neve De Mevergnies et al. |
| 2016/0381050 A1* | 12/2016 | Shanbhogue ......... G06F 12/109 |
| | | 726/23 |

OTHER PUBLICATIONS

"Branch predictor" Wikipedia: The Free Encyclopedia. Wikimedia Foundation, Inc. Last Edited: Dec. 11, 2019, https://en.wikipedia.org/wiki/Branch_predictor (Year: 2019).

* cited by examiner

SYSTEMS AND METHODS FOR OPTIMIZING AUTHENTICATION BRANCH INSTRUCTIONS

CROSS REFERENCE TO RELATED APPLICATIONS

This application is a continuation of U.S. patent application Ser. No. 15/484,439, now U.S. Pat. No. 11,468,168, entitled "SYSTEMS AND METHODS FOR OPTIMIZING AUTHENTICATION BRANCH INSTRUCTIONS", filed Apr. 11, 2017, the entirety of which is incorporated herein by reference.

BACKGROUND

Technical Field

Embodiments described herein relate to the field of processors and more particularly, to efficient handling of subroutine epilogues.

Description of the Related Art

Based on a variety of factors, modern processors update the program counter (PC) register holding the address of the memory location storing the next one or more instructions of a computer program to fetch. One factor is the execution of control transfer instructions. Examples of control transfer instructions are conditional branch instructions, jump instructions, call instructions in subroutine prologues and return instructions in subroutine epilogues. When a subroutine is used in a software application, control is transferred to the region of memory that stores the instruction sequence of the subroutine. The address of the memory location storing the subroutine call instruction in the computer program is stored in order to return to this location in the computer program once processing of the subroutine completes. This address is referred to as the return address.

The return address and local variables used during the execution of the subroutine are stored in the stack. The stack has a finite size which is set when the subroutine is called.

When poor or no bounds checking occurs prior to storing user-provided data, instructions in the subroutine are able to accept more data than supported by the finite size of the stack. In such cases, local variables including the return address are overwritten. Malicious programmers modify the return address to a desired address to alter control flow of the computer program. In some cases, the malicious programmers also inject their own signature as user-provided data being stored in the stack.

Techniques, such as Data Execution Prevention (DEP), protects against injected signature attacks by ensuring each writable page in memory is non-executable. Such techniques are also referred to as "Write XOR Execute" techniques implemented by operating systems to make each page in memory either writable or executable, but not both. To bypass these protective techniques, malicious programmers select instruction sequences already existing within libraries and obtain the addresses of the selected instruction sequences. One or more of the instruction sequences include a return instruction. Each instruction sequence is referred to as a gadget.

The malicious programmer overwrites the original return address to transfer control to a string of selected gadgets, which are executable as they are preexisting and not written to memory as data by the malicious programmer's application. The malicious programmer is now able to perform desired operations and severely change computer program behavior. Such manipulation of the stack and controlling of program flow is referred to as a return oriented programming (ROP) attack. Other attacks are similar such as jump oriented programming (JOP) attacks using register-indirect jumps to string together gadgets. The ROP and JOP attacks are used in a variety of malicious applications ready to be downloaded and run on multiple examples of computing devices capable of inadvertently providing user sensitive information.

SUMMARY

Systems, apparatuses, and methods for efficient handling of subroutine epilogues are contemplated.

In various embodiments, a decode unit in a processor identifies an indirect control transfer instruction corresponding to a procedure return for a subroutine in a computer program and sends an indication to an authenticator to generate a cryptographic signature for the associated return address. In some embodiments, a return address stack (RAS) is notified to provide a predicted return address. Further, a load/store unit receives a load instruction for reading the copy of the return address stored in memory such as a memory stack provided by the operating system. The authenticator generates the signature for comparison to a copy of the signature generated earlier during the procedure call for the same subroutine. In some embodiments, the authenticator generates the signature based on the copy of the return address from the RAS. In other embodiments, the authenticator generates the signature based on the copy of the return address from the memory stack.

When the authenticator generates the signature, it uses one or more keys stored in secure memory, the return address, and possibly one or more other values as selected by designers as inputs to the cryptographic algorithm. The generated signature is later compared with a copy of the signature generated and stored earlier when the procedure call completed. In various embodiments, the RAS provides a predicted branch target address for instruction fetching before a copy of the branch target address is obtained from the memory stack and before the authenticator completes. Although instruction processing continues while authentication has yet completed, the indirect control transfer instruction corresponding to the procedure return is not permitted to commit. As the pipeline uses in-order commit, no instruction commits before authentication completes although the instructions are processing.

When the memory stack provides a copy of the return address, this copy is compared with the copy of the return address supplied earlier by the RAS. If a mismatch is found, then branch misprediction recovery is performed. Otherwise, the instruction processing continues. When the authenticator completes regenerating the cryptographic signature, this value is compared to one or more of the copies of the signature retrieved earlier from the RAS and the memory stack.

If the compared values match, instruction processing continues and the register indirect control transfer instruction is permitted to commit. If a mismatch is found during the one or more comparisons of the copies of the signature, then an exception is generated and processor execution halts with no instruction or state committed. Therefore, security is provided without impacting performance during the procedure return.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

Figure 1:
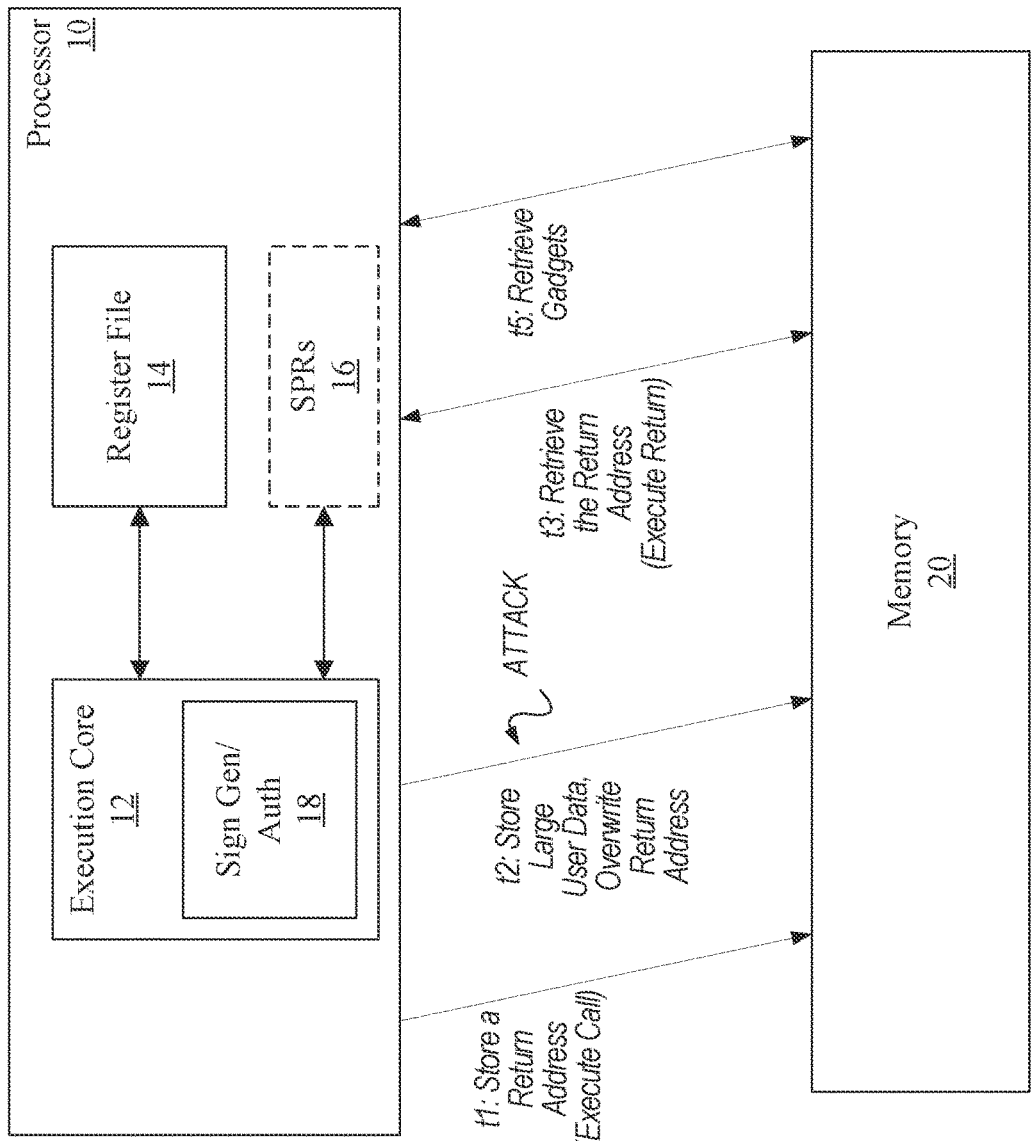
FIG. 1 is a block diagram of one embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112 (f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning now to FIG. 1, a block diagram of one embodiment of a computing system 100 is shown. In the illustrated embodiment, the computing system 100 includes a processor 10 and memory 20. Interface logic, controllers and buses are not shown for ease of illustration. The processor 10 uses at least one execution core 12, a register file 14 and optionally one or more special purpose registers 16. The processor 10 may be representative of a general-purpose processor that performs computational operations. For example, the processor 10 may be a central processing unit (CPU) such as a microprocessor, a microcontroller, an application-specific integrated circuit (ASIC), or a field-programmable gate array (FPGA). The processor 10 may be a standalone component, or may be integrated onto an integrated circuit with other components (e.g. other processors, or other components in a system on a chip (SOC)). The processor 10 may be a component in a multichip module (MCM) with other components.

The execution core 12 may be configured to execute instructions defined in an instruction set architecture implemented by the processor 10. The execution core 12 may have any microarchitectural features and implementation features, as desired. For example, the execution core 12 may include superscalar or scalar implementations. The execution core 12 may include in-order or out-of-order implementations, and speculative or non-speculative implementations. The execution core 12 may include any combination of the above features. The implementations may include microcode, in some embodiments.

The execution core 12 may include a variety of execution units, each execution unit configured to execute operations of various types (e.g. integer, floating point, vector, multimedia, load/store, etc.). The execution core 12 may include different numbers of pipeline stages and various other performance-enhancing features such as branch prediction. The execution core 12 may include one or more of instruction decode units, schedulers or reservations stations, reorder buffers, memory management units, I/O interfaces, etc.

The register file 14 may include a set of registers that may be used to store operands for various instructions. The register file 12 may include registers of various data types, based on the type of operand the execution core 12 is configured to store in the registers (e.g. integer, floating point, multimedia, vector, etc.). The register file 14 may include architected registers (i.e. those registers that are specified in the instruction set architecture implemented by the processor 10). Alternatively or in addition, the register file 14 may include physical registers (e.g. if register renaming is implemented in the execution core 12).

The special purpose registers (SPRs) 16 may be registers provided in addition to the general purpose registers. While general purpose registers may be an operand for any instruction of a given data type, special purpose registers are generally operands for particular instructions or subsets of instructions. For example, in some embodiments, a program counter register may be a special purpose register storing the fetch address of an instruction. A link register may be a register that stores a return address, and may be accessible to branch instructions. While the special purpose registers 16 are shown separate from the register file 14, they may be integrated into the register file 14 in other embodiments. In some embodiments, certain general purpose registers may be reserved by compiler convention or other software convention to store specific values (e.g. a stack pointer, a frame pointer, etc.).

In some embodiments, the memory 20 is an off-die next level cache in a cache memory hierarchy. In other embodiments, the memory is any type of lower-level memory such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc.

In various embodiments, while processing software applications, the processor 10 processes instructions of a subroutine. Subroutines contain a sequence of machine level or assembly level instructions used to perform a task that is referred to as often as needed in a software application. Subroutines are also referred to as functions or procedures. However, some software developers use the term "subroutine" when the instruction sequence does not return a value and use the term "function" when the instruction sequence does return a value. In various embodiments, the instruction sequences are stored in particular regions of memory associated with a library of tasks.

When a subroutine is used in a software application, control is transferred to the region of memory associated with the library. This region stores the instruction sequence. In order to return to the software application once processing of the subroutine completes, the location where the call of the subroutine occurred is stored. This location is indicated by the return address. Therefore, the branch target address for the procedure return (exit point) is the return address.

In various embodiments, each of the entry point and the exit point of a subroutine uses a control transfer instruction. Examples of control transfer instructions are conditional branch instructions, unconditional branch instructions, which are also referred to as jump instructions, the jump instruction of call instructions of subroutine prologues and the jump instruction in return (jump) instructions of subroutine epilogues. It is noted that throughout this disclosure, the terms "control transfer instruction" and "branch instruction" may be used interchangeably. Additionally, while the term "branch instruction" or (or more briefly, "branch") may be used throughout this disclosure, it should be understood that the term applies to any type of control transfer instruction that may be utilized in an instruction set architecture.

Conditional control transfer instructions are used to implement loops in the compute program. An unconditional control transfer instruction (jump instruction) is considered an always taken conditional control transfer instruction and there is no condition to test. Execution of jump instructions always occurs in a different sequence than sequential order. Jump instructions are used for case and switch statements in the computer program.

Some control transfer instructions specify the branch target address by an offset stored within the instruction itself. Such control transfer instructions are referred to as direct. The offset is relative to the program counter (PC) register value. The PC register value is used to fetch instructions from an instruction cache or memory. Other control transfer instructions store an indication indicating a register or memory location used to store the branch target address. These control transfer instructions are referred to as indirect. The specified register or memory location storing the branch target address may be loaded with different values. Unconditional indirect control transfer instructions are used to implement procedure calls and returns of subroutines.

In the illustrated embodiment of FIG. 1, a series of time events are shown. For example, at time t1, a subroutine is processed and instructions for the corresponding call are processed. The operating system provides each thread with an address space corresponding to memory locations for storing instructions, data, a heap and a stack. Each thread is also provided with control registers such as at least a stack pointer and a program counter. The instructions of the subroutine are transferred from memory 20 to an instruction cache in the processor 10, from which they are fetched for processing. Local variables used during the execution of the subroutine are stored in the temporary region of memory 20 referred to as the stack. One of the initial values stored in the stack is the return address.

The processing of the instructions for the subroutine call includes storing the return address in the memory 20. The return address may also be stored in a return address stack (RAS) and/or a link register in the special purpose registers 16 for faster retrieval. A branch target buffer (BTB) is used during the procedure call for faster retrieval of the branch target address pointing to the region in memory 20 which stores the instructions of the subroutine.

In order to distinguish storage locations, the stack provided by the operating system is referred to as the memory stack although it could also be referred to as the thread stack, call stack or machine stack. Therefore, it is possible that two copies of the return address are stored. One copy is stored in the memory stack and a second copy is stored in the SPR 16 which has lower latency for retrieving the value of the return address.

In various embodiments the processor 10 performs a sign operation on the return address of the subroutine which is stored to memory 20 at time t1. The processor 10 may also perform a sign operation on other jump addresses to detect whether or not the address have been modified between the time they were created/stored and the time they are used as a target address. Performing a sign operation on a value, such as an address of a jump instruction, may be more succinctly referred to herein as "signing" the value. In some embodiments, the processor 10 performs the signature generation and later authentication in hardware. For example, signature generation/authentication circuit 18 uses circuitry to sign and authenticate return addresses and jump addresses.

Performing a sign operation or "signing" an address may refer to applying a cryptographic function to the address using at least one cryptographic key and optionally using additional data. In some embodiments, the additional data is at least a portion of the return address. In other embodiments, the additional data is at least a portion of the program counter (PC) value corresponding to the jump instruction. In yet other embodiments, the optional additional data includes an address at which the return/jump address is stored. For example, a virtual address of the location may be used (e.g. the virtual stack pointer, for storage of the address on the stack, or a virtual address to the memory location for any other memory location). Other embodiments may use the physical address.

In some embodiments, the cryptographic key is specific to the thread that includes the generation of the return address, and thus the likelihood of an undetected modification by a third party without the key is exceedingly remote. In one embodiment, the cryptographic key is generated, at least in part, based on a "secret" that is specific to the instance of the processor 10 and is not accessible except in hardware. The cryptographic key itself is not be accessible to software, and thus the key remains secret and difficult to discover by a third party.

The cryptographic function applied to a particular return/jump address may be an encryption of the address using the key(s). The result of the cryptographic function is a signature. The encrypted result as a whole may be the signature, or a portion of the result may be the signature (e.g. the signature may be shortened via truncation or shifting). Any encryption algorithm may be used, including a variety of examples given below.

The memory location in the memory stack used to store the return address may use sign extension. Rather than continue storing a sign extended value, in some embodiments, the generated cryptographic signature is stored in its place. Therefore, the memory location in the memory stack stores both the signature and the return address (which may also be referred to as the pointer). Additionally, if a RAS or another register, such as a link register, in the SPR 16 is used for faster retrieval of the return address, the signature is also stored with the pointer in these storage locations.

By applying the cryptographic function again at a later point and comparing the result to the signature, an authenticate operation may be performed on the address (or the address may be "authenticated"). That is, if the address and/or signature have not been modified, the result of the cryptographic function should equal the signature.

The return address and local variables used during the execution of the subroutine are stored in a corresponding stack in the memory 20. Any jump addresses used prior to or within the subroutine may be written to an arbitrary location in the memory 20, in the stack or outside the stack, for later retrieval. The stack has a finite size which is set when the subroutine is called. When poor or no bounds checking occurs prior to storing user-provided data, instructions in the subroutine are able to accept more data than supported by the finite size of the stack. In such cases, as at time t2 in the illustrated embodiment, local variables including the return address are overwritten.

When the return address is modified in the memory stack in memory 20, control flow is altered when the subroutine ends and instructions corresponding to the subroutine return are processed. During this instruction processing by the processor 10, the overwritten return address is retrieved from memory 20 at time t3, and transitions to a location in memory indicated by the modified value.

In the past, malicious programmers modified the return address to point to memory locations storing their injected signature. However, techniques, such as Data Execution Prevention (DEP), protects against this scenario by ensuring each writable page in memory is non-executable. Such techniques are also referred to as "Write XOR Execute" techniques implemented by operating systems to make each page in memory either writable or executable, but not both.

To bypass the above protective techniques, malicious programmers select instruction sequences already existing within libraries and obtain the addresses of the selected instruction sequences. One or more of the instruction sequences include a return instruction. Each instruction sequence is referred to as a gadget. The string of selected gadgets are executable as they are preexisting instructions in the library and not written by the malicious programmer.

The malicious programmer is now able to perform desired operations and severely change computer program behavior. Such manipulation of the stack and controlling of program flow is referred to as a return oriented programming (ROP) attack. Other attacks are similar such as jump oriented programming (JOP) attacks using register-indirect jump (branch) instructions to string together gadgets. Control flow attacks are used to gain access to sensitive information on computing devices, especially mobile computing devices such as smartphones. The malicious programmers can also open a remote reverse shell on the smartphone as well as remove many limitations from the operating system in a process known as jailbreaking.

At time t4, when the return address is later retrieved from memory 20 to be used as the target address, the processor 10 performs an authenticate operation on the retrieved address. The cryptographic signature is regenerated using the retrieved return address, one or more cryptographic keys and any additional data as performed earlier at time t1. In an embodiment, the sign and authenticate operations are performed on the addresses in registers as well. For example, a general purpose register in the register file 14 may be used as a source for a return address or jump address, and may be signed and authenticated. A special purpose register 16 such as a link register may be signed and authenticated, in some embodiments. In an embodiment, data pointers (addresses to data in memory, where the data is operated upon during instruction execution in the processor 10) may also been signed and authenticated.

While the signature is being regenerated based at least on the return address retrieved from memory 20, the processor 10 continues processing instructions. Therefore, no stalling occurs while regeneration of the signature is performed although the regeneration consumes an appreciable amount of time. Although unbeknownst to the user, the retrieved return address, which is modified, is used as a fetch address by the processor 10. Accordingly, at time t5, the processor 10 retrieves gadgets from memory 20. However, the processor 10 does not yet commit state.

The jump instruction used to retrieve the return address is permitted to continue processing and become the oldest instruction in the pipeline. However, this jump instruction is not yet allowed to commit. Younger instructions in program order are also allowed to continue processing although these instructions may be instructions of the malicious programmer's gadgets. However, these younger instructions are not allowed to commit as they wait on the older jump instruction for in-order commit.

At time t6, the regeneration of the signature completes. In some embodiments, the regeneration consumes an appreciable amount of more time than the resolution of the target address for the indirect jump (branch) instruction used during the epilogue of the subroutine. In some embodiments, resolving the target address includes retrieving the signed return address from the stack in memory 20. Retrieving the signed return address consumes multiple pipeline stages, and therefore, branch prediction is used to obtain a value for the target address (return address) sooner. In one example, an RAS or a link register in the SPRs 16 is used to provide a predicted target address one clock cycle later. The prediction target address is verified after the target address is resolved through retrieving the return address from memory 20. In one example, the target address is resolved after four clock cycles. Therefore, the processor 10 had continued with speculative instruction processing for three clock cycles using the predicted target address.

The predicted target address is compared to the resolved target address. As the return address was overwritten at time t2, a mismatch is found and recovery is performed. Instructions younger in program order than the indirect control flow instruction (jump instruction) are flushed from the processor pipeline. Afterward, the fetching of instructions begins with the resolved target address, which is the modified return address. In one example, the regeneration of the signature from the modified return address completes after nine clock cycles. Therefore, the processor 10 fetched and processed instructions corresponding to gadgets for five clock cycles beginning with the modified return address as the initial fetch address. However, no state is committed during these clock cycles.

The regenerated signature is compared to at least the signature stored with the retrieved return address. If a match did occur, which in this case it won't, then the indirect jump instruction used during the subroutine return is permitted to commit. In some embodiments, for the indirect jump instruction to commit, each of the copies of the signature in the RAS, in any registers in the SPRs 16, and in the memory stack in memory 20 are required to match one another. However, in this example, as the return address was modified at time t2, the comparison of the signatures results in a mismatch. Accordingly, the authentication operation provides an indication of failing, which initiates error handling steps. In some embodiments, the mismatch causes an exception to be generated and processor 10 halts further processing with no instruction or state committed by the indirect jump instruction or younger instructions. Therefore, security is provided without impacting performance during the subroutine return.

Figure 2:
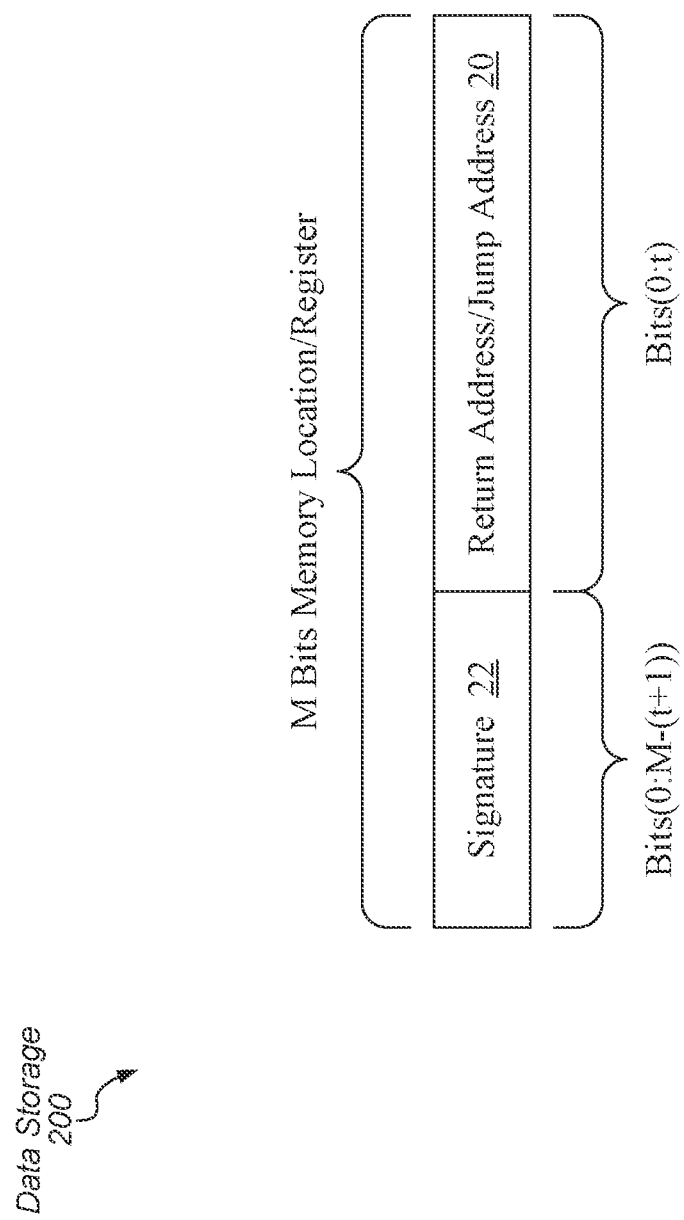
FIG. 2 is a block diagram of one embodiment of data storage.

Turning now to FIG. 2, a block diagram illustrating one embodiment of data storage 200 is shown. The data storage 200 shows how information is stored in an M bit memory location or register. The value M may be an integer greater than zero. More particularly, M may be the architectural size of a virtual address in the processor 10. For example, some instruction set architectures specify 64 bit addresses currently. However, the actual implemented size may be less (e.g. 40 to 48 bits of address). Thus, some of the address bits are effectively unused in such implementations. The unused bits may be used to store the signature for the address, in an embodiment. Other embodiments may store the signature in another memory location.

In the embodiment of FIG. 2, t+1 bits of the return address or the jump address are implemented (field 20), where t is less than M and is also an integer. The remaining bits of the register/memory location store the signature (field 22). The signature as generated from the encryption algorithm may be larger than the signature field 22 (e.g. larger than M−(t+1) bits). Accordingly, the signature actually stored for the address may be a portion of the signature. For example, the signature may be truncated. Alternatively, the signature may be right-shifted. Any mechanism for shortening the signature field may be used.

In some embodiments, the signature generation and authentication operations are performed in hardware. Additionally, there may be instructions defined for the instruction set architecture which cause the signature to be generated or authentication to be performed. For example a Sign instruction takes as input operands an optional virtual address (VA), a source register (RS), and a key. Therefore, the Sign instruction may appear as Sign ([VA], RS, Key), which returns a value to a target register, in a computer program. The virtual address may be in a register as well. The key may be stored in a hardware-accessible register or other storage device for access by the hardware only. The key may be one key, or multiple keys, depending on the selected encryption algorithm.

The Sign instruction may apply an encryption algorithm to the data (e.g. the RS and the VA, in this case) producing a signature which may be written to a target register. When more than one datum is provided, the data may be combined prior to the encryption (e.g. the RS and the VA may be logically combined according to any desired logic function) and the resulting data may be encrypted. Alternatively, the data may be concatenated and encrypted using multiple passes of a block encryption (block cipher) mechanism. Any type of encryption may be used, including any type of block encryption such as advanced encryption standard (AES), data encryption standard (DES), international data encryption algorithm (IDEA), PRINCE, etc. A factor in determining the encryption algorithm to be used is latency of the algorithm. Accordingly, a single pass of encryption may be selected that is strong enough to protect the encrypted data to a desired level of security. A signature resulting from the encryption may then be shortened to match the field 22. The result in the target register may be of the form shown in FIG. 2.

Another embodiment of the signature generation instruction operates on data being stored to memory. For example, the ystp instruction stores a pair of registers to a location in the memory stack identified by an immediate field. The two registers may be identified by RS1 and RS2, whereas the immediate field may be identified as imm5. Therefore, the ystp instruction may appear as ystp(imm5, Key, RS1, RS2) in a computer program. The immediate field, imm5, may be an offset from the stack pointer.

The ystp instruction may also sign at least one of the register values, or both in another embodiment, using the key and the selected encryption algorithm (and optionally the virtual address to which the pair is being stored, e.g. the stack pointer plus the imm5 field. The pair of registers may be the frame pointer and the link register. The link register may be signed in response to the instruction, and the signed value may be stored to memory.

While the ystp instruction stores a pair of registers to memory, a corresponding yst instruction may be defined that stores one register to memory (and generates a signature for the register data). Therefore, the yst instruction may appear as yst(imm5, Key, RS1) in a computer program. Other instructions may store other numbers of registers to memory, and may generate signatures for any subset or all of the registers. Furthermore, other instructions may use other addressing modes and need not store the signed addresses on the stack.

For the authentication operations, an Auth instruction is used and takes as input operands an optional virtual address (VA), a source register (RS), and a key or keys. Therefore, the Auth instruction may appear as Auth ([VA], RS, Key), which returns a value to a target register, in a computer program. The virtual address may be in a register as well. The key(s) may be stored in a hardware-accessible register(s) or other storage device(s) for access by the hardware only. In some embodiments, the Auth instruction applies the same encryption algorithm as the Sign instruction to the virtual address and the return/jump address field 20 of the source register data (e.g. the RS and the VA, in this case) producing a signature which may be written to a target register.

In various embodiments, the signature result from the Auth instruction is compared to the signature field 22 of the source register data (shortened in the same fashion as the original signature was shortened). If the signatures do not match, the authentication fails, the speculative processing of instructions ends, and an exception is generated. If the signatures match, the authentication passes, the processing of instructions becomes non-speculative, and both instructions and corresponding state are permitted to commit.

Another embodiment of the authentication instruction may operate on data being read from memory. For example, the yldp instruction loads a pair of registers from a location in the stack identified by the immediate field. The two registers may be identified by RT1 and RT2, whereas the immediate field may be identified as imm5. Therefore, the yldp instruction may appear as yldp(imm5, Key), which returns two values to the two registers RT1 and RT2, in a computer program. The immediate field, imm5, may be an offset from the stack pointer.

The yldp instruction may also authenticate at least one of the register values, or both in another embodiment, using the key(s) and the selected encryption algorithm (and optionally the virtual address from which the pair is being read, e.g. the stack pointer plus the imm5 field). The pair of registers may be the frame pointer and the link register. The link register may be authenticated in response to the instruction, and an exception may be signaled if the authentication fails.

While the yldp instruction reads a pair of registers from memory, a corresponding yld instruction may be defined that reads one register from memory (and authenticates the data). Therefore, the yld instruction may appear as yld(imm5, Key) in a computer program. Other instructions may load other numbers of registers from memory, and may authenticate any subset or all of the registers, and may use other addressing modes and may store addresses elsewhere than on the stack. In an embodiment, it may be desirable to remove the signature from the address without authenticating the address. A strip instruction may be defined that may remove the signature and replace it with the original bits from the address (e.g. a sign extension of the address field 20, or zeros).

As described earlier, subroutines contain a sequence of machine level or assembly level instructions used to perform a task that is referred to as often as needed in a software application. Subroutines uses a prologue, a body and an epilogue. The prologue uses instructions to allocate space in a memory stack for local values and the return address, make space for the return value if there is one, push the parameters currently stored in registers onto the memory stack, push the return address onto the memory stack, and jump (transfer control) to the subroutine. The body uses instructions to perform the often referred task based on a software developer's algorithm. The epilogue uses instructions to free local variable space in the memory stack, free the parameters, pop the return address and pop result if there is one.

The push operation may include the processing of multiple assembly language instructions such as one or more increment/decrement instructions for updating pointers and a store instruction to write the return address in the memory stack. Similarly, the pop operation may include one or more increment/decrement instructions for updating pointers and a load instruction to read the return address from the memory stack. Below, the method 300 is directed at the push operation, whereas the later methods 400 and 500 are directed at the pop operation.

Figure 3:
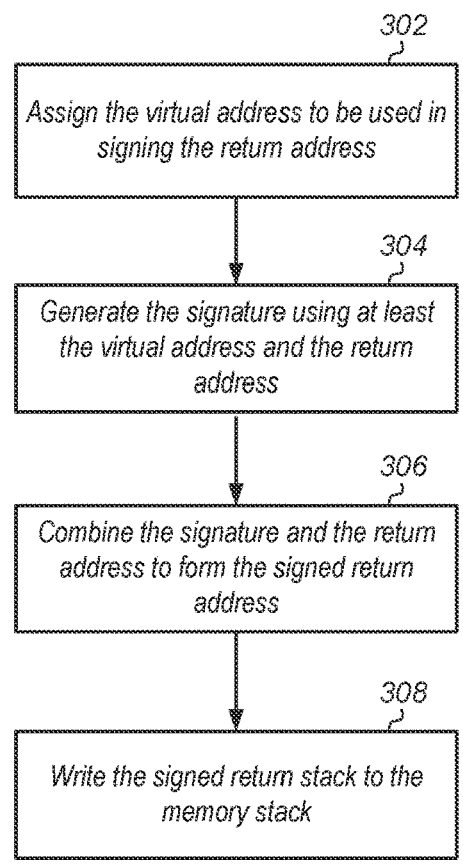
FIG. 3 is a flow diagram of one embodiment of method for pushing a return address with signing.

Turning now to FIG. 3, one embodiment of a method 300 for pushing a return address with signing is shown. For purposes of discussion, the steps in this embodiment (as well as the methods shown in FIG. 4 and FIG. 5) are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 300.

In various embodiments, a software application is compiled, and the operating system divides the application into multiple processes and further divides the processes into threads. Each thread is provided with an address space corresponding to memory locations for storing instructions, data, a heap and a stack. Each thread is also provided with control registers such as at least a stack pointer and a program counter. The instructions are transferred from memory to an instruction cache, from which they are fetched for processing. Regarding the push operation for a subroutine prologue, in some embodiments, the virtual address (VA) to be used in signing the return address is the stack pointer (SP). Alternatively, the virtual address is the stack pointer added to an offset which identifies the location at which the return address is to be pushed (block 302).

The signature based on the virtual address, the return address (RA), and the key may be generated by applying the selected encryption algorithm to the data (block 304). In some embodiments, a temporary value may be formed by concatenating bits of the virtual address to the implemented portion of the return address. That is, if t+1 bits of return address are implemented, M−(t+1) bits of the virtual address may be concatenated (block 58). The temporary value may be encrypted using the key and the selected encryption algorithm to generate the signature.

In other embodiments, the virtual address and the return address may be encrypted in multiple passes of a block encryption algorithm. An encryption algorithm uses a pair of keys (K0 and K1) where the key K0 is a "whitening" key, and key K1 is a "core" key. The core key may be used in the iterations of the block cipher, and the whitening key may be used before and/or after the iterations are complete to further modify the data. In some embodiments, the key K1 is combined with the virtual address, such as by an exclusive-or (XOR) operation to form the core key used for the encryption.

Any form of encryption may be used. In an embodiment, the PRINCE algorithm may be used. In an embodiment, any tweakable block cipher may be used as the encryption algorithm, where the VA is used as the tweak. Generally, various embodiments may use the block cipher to achieve a symmetric signature scheme (or message authentication code (MAC)).

The generated signature may be combined with the return address to form the signed return address (block 306). In some embodiments, combining is performed by concatenating the generated signature and the return address as shown earlier in the data storage 200. The signed return address is written to the memory stack (block 308), which pushes the signed return address onto the memory stack.

Figure 4:
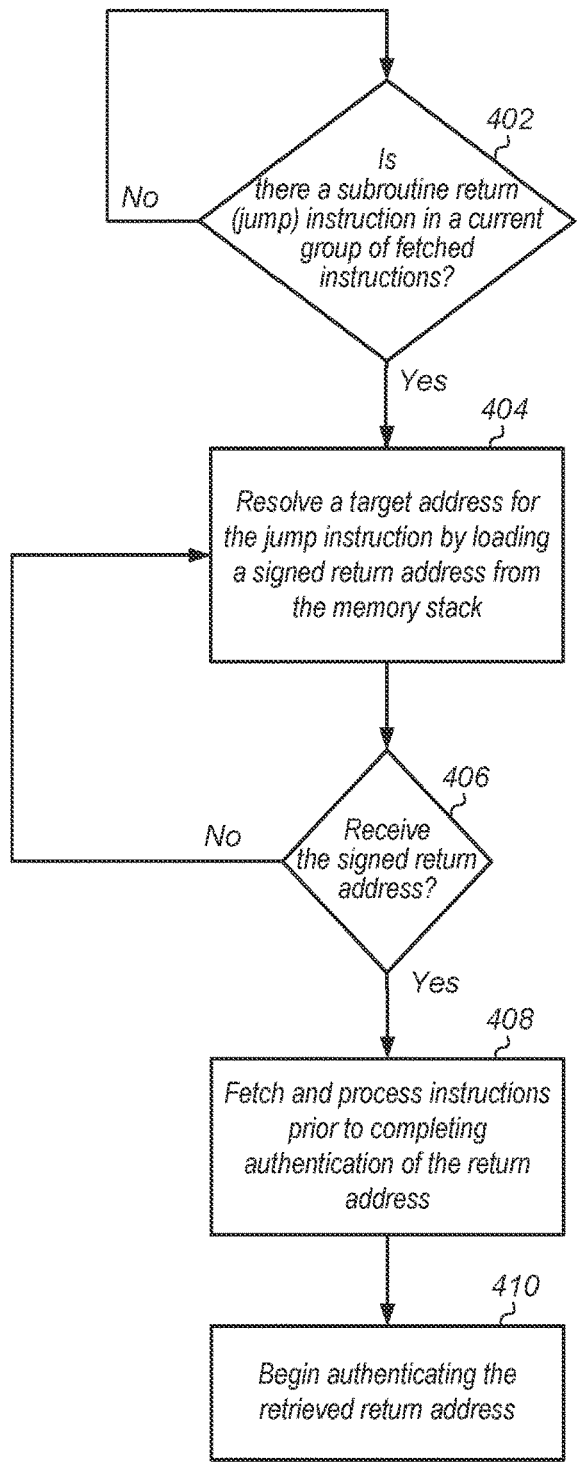
FIG. 4 is a flow diagram of one embodiment of method for processing a subroutine return (jump) instruction.

Referring now to FIG. 4, one embodiment of a method 400 for processing a subroutine return (jump) instruction is shown. Processing this jump instruction occurs for the subroutine epilogue and includes popping a return address from the memory stack.

Instructions are transferred from memory to an instruction cache in a processor, from which they are fetched for processing. If there is a subroutine return (jump) instruction in the current group of fetched instructions ("yes" branch of the conditional block 402), then resolving a target address for this jump instruction begins (block 404). In various embodiments, the target address is resolved by reading the signed return address from the memory stack.

In some embodiments, resolution completes when the signed return address is retrieved from the memory stack to the processor. In an embodiment, a copy of the signed return address is retrieved from level-one (L1) data cache, a L2 data cache or other, rather than from lower-level memory. In some embodiments, resolving the target address by loading the signed return address consumes multiple pipeline stages in the processor. Therefore, branch prediction is used to obtain a value for the target address sooner. For example, an RAS, a link register, or data storage is used to provide a predicted target address sooner. The predicted target address is used as a fetch address and speculative instruction processing begins. The speculative instruction processing continues until at least resolution of the target address completes. In various embodiments, the jump instruction is not yet permitted to commit.

If the signed return address has not yet been received from the memory stack ("no" leg of the conditional block 406), then control flow of method 400 returns to block 404. Speculative instruction processing continues while the processor waits for the signed return address to arrive. If the signed return address has been received from the memory stack ("yes" leg of the conditional block 406), then instructions are fetched using the return address of the signed return address and the instructions are processed prior to authentication of the return address completes (block 408). Since authentication has not yet completed, the instruction processing is speculative.

When the signed returned address is received, authentication also begins for the return address (block 410). As described earlier, a signature was generated earlier such as during the subroutine prologue. In various embodiments, the generation of the signature is based on at least a portion of the pointer (return address). In various embodiments, the steps used to continue processing the instructions and to authenticate the retrieved return address in blocks 408 and 410, respectively, occur concurrently in the processor pipeline. In some embodiments, the concurrent steps in blocks 408 and 410 are associated with separate instructions or micro-ops. In other embodiments, the concurrent steps in blocks 408 and 410 are associated with a single instruction or micro-op. This single instruction may have been received in the earlier conditional block 402 of method 400. The single instruction is an indirect branch authenticate instruction used for the return steps in a subroutine epilogue.

In some embodiments, the return address is considered to be "resolved" when the return address is received by the process from the memory stack although the retrieved return address is not yet authenticated. Any further processing of instructions is speculative until authentication completes. Therefore, the indirect jump is "resolved," but speculative processing continues. In other embodiments, the return address is not considered to be "resolved" until the retrieved return address is authenticated and any further processing of instructions is no longer speculative based on the indirect jump instruction using the return address.

In some embodiments, the predicted target address from the RAS, link register or other, is compared to the return address retrieved from the memory stack. If a mismatch is found, then recovery begins. Instructions younger in program order than the jump instruction are flushed from the processor pipeline. Afterward, the fetching of instructions begins with the retrieved return address. As the retrieved return address has yet to be authenticated, instruction processing is still speculative and the jump instruction is still not yet permitted to commit. If a match is found between the predicted target address and the retrieved return address, then the processing of instructions continues although the processing is still considered speculative and the jump instruction is still not yet permitted to commit.

Figure 5:
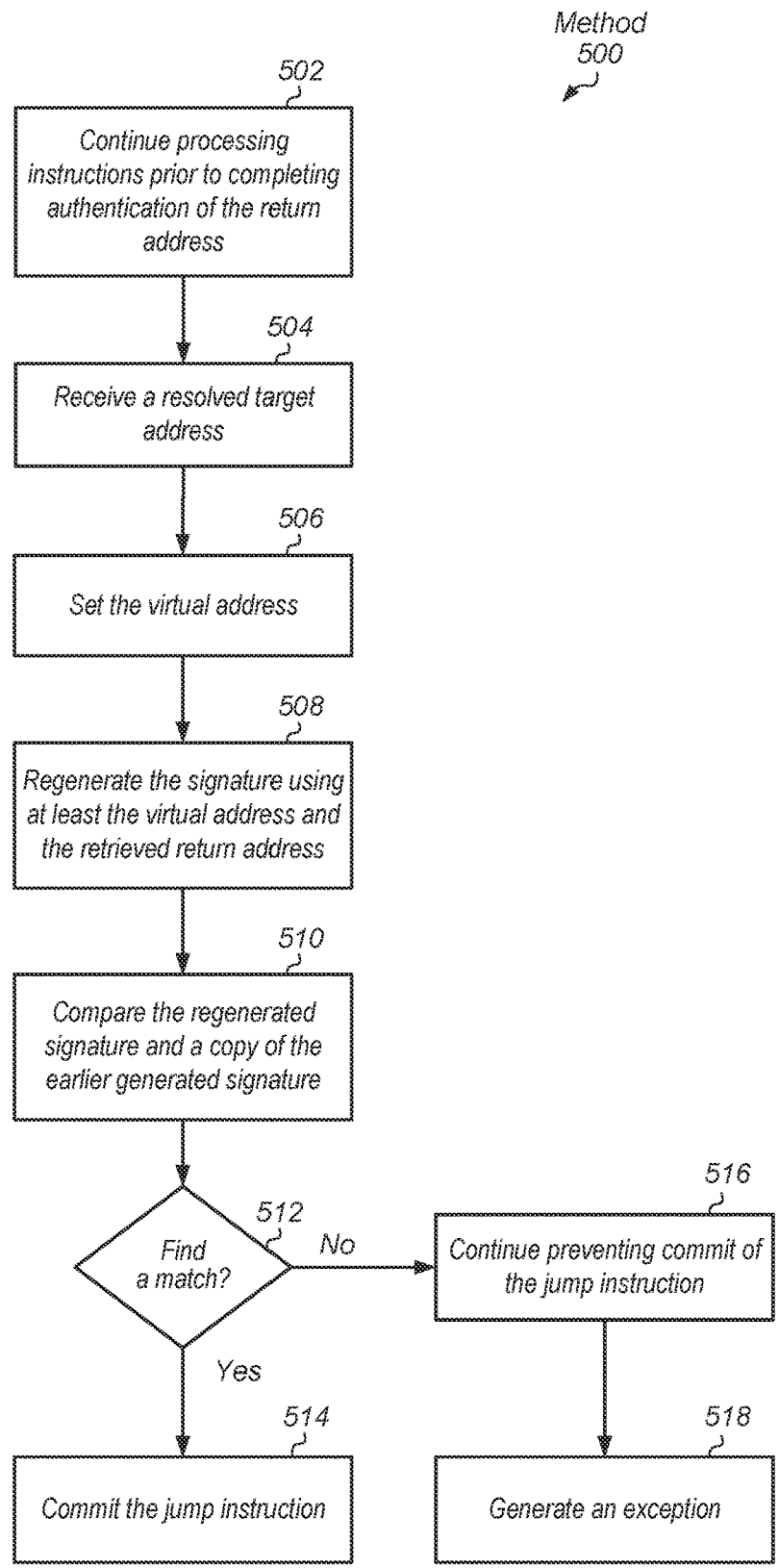
FIG. 5 is a flow diagram of one embodiment of method for authenticating a branch target address (return address).

Turning now to FIG. 5, one embodiment of a method 500 for authenticating a branch target address (return address) is shown. Authenticating the return address completes the popping of the return address and the subroutine epilogue although the return address was already used to fetch instructions for processing. In various embodiments, the processing of instructions continues prior to authentication completes for the return address (block 502). In various embodiments, the target address for the jump instruction is resolved and provided to an authenticator, which receives the return address (block 504).

As described earlier, in some embodiments, authentication is implemented in hardware, whereas in other embodiments, authentication is performed by the processing of instructions in an ISA. In various embodiments, authentication has an appreciable multi-cycle latency. Despite this latency, in some embodiments, speculative fetching with the return address and speculative instruction processing continue prior to the authentication completes.

Similar to the original signature generation, the virtual address may be set to one of the stack pointer or the stack pointer plus an offset to the location of the return address (block 506). In various embodiments, the signature is regenerated by applying the same operation(s) that was applied when the return address was initially signed (block 508). To regenerate the signature, the same encryption algorithm is now applied to the virtual address, the return address retrieved from the memory stack, and the key. The steps described earlier for block 304 of method 300 may be performed again.

When the regeneration completes, the regenerated signature is compared to the earlier signature (block 510). If a match is found ("yes" branch of the conditional block 512), then authentication succeeds and the indirect jump instruction is marked to be committed (block 514). Otherwise, if a match is not found ("no" branch of the conditional block 512), then authentication fails and the indirect jump instruction continues to be marked for preventing instruction commit (block 516).

In some embodiments, the indirect jump instruction is also marked with an indication of a branch misprediction when a match is not found. In an embodiment, information is recorded in an exception monitor for later review. Examples of the information are the retrieved signed return address, a thread ID, the virtual address in addition to the physical address used as the program counter value of the indirect jump instruction, and so on. In various embodiments, an exception is generated (block 518) and any further processing of the instructions currently in-flight are halted in the processor pipeline. A corresponding exception trap handler may then be fetched and executed.

Figure 6:
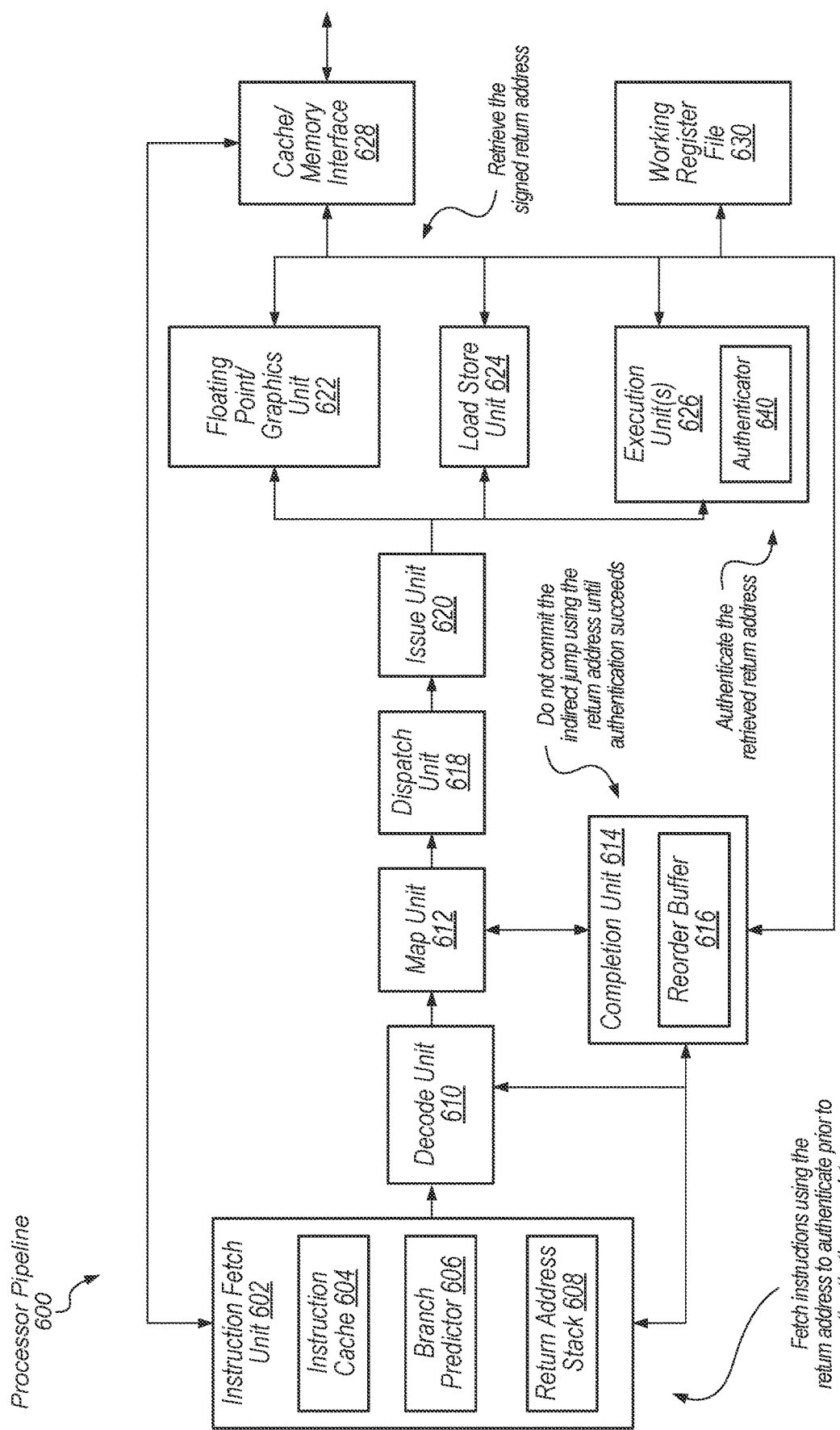
FIG. 6 is a block diagram of one embodiment of a processor pipeline.

Turning now to FIG. 6, a block diagram illustrating one embodiment of a pipeline of a processor 600 is shown. In various embodiments, the logic of processor 600 may be included in one or more of cores of a central processing unit (CPU). Processor 600 includes instruction fetch unit (IFU) 602 which includes an instruction cache 604, a branch predictor 606 and a return address stack (RAS) 608. IFU 602 may also include a number of data structures in addition to those shown such as an instruction translation lookaside buffer (ITLB), instruction buffers, and/or other structures configured to store state that is relevant to thread selection and processing (in multi-threaded embodiments of processor 600).

IFU 602 is coupled to an instruction processing pipeline that begins with a decode unit 610 and proceeds in turn through a map unit 612, a dispatch unit 618, and issue unit 620. Issue unit 620 is coupled to issue instructions to any of a number of instruction execution resources including execution unit(s) 626, a load store unit (LSU) 624, and/or a floating-point/graphics unit (FGU) 622. The execution unit(s) 626 use an authenticator 640 for generating and checking signatures based on at least a portion of a return address used for a procedure return.

The instruction execution resources 622-626 and 640 are coupled to a working register file 630. Additionally, LSU 624 is coupled to cache/memory interface 628. Reorder buffer 616 is coupled to IFU 602, decode unit 610, working register file 630, and the outputs of any number of instruction execution resources. It is noted that the illustrated embodiment is merely one example of how processor 600 may be implemented. Processor 600 may include other components and interfaces not shown in FIG. 6. Alternative configurations and variations are possible and contemplated.

In one embodiment, IFU 602 may be configured to fetch instructions from instruction cache 604 and buffer them for downstream processing. The IFU 602 may also request data from a cache or memory through cache/memory interface 628 in response to instruction cache misses, and predict the direction and target of control transfer instructions (e.g., branches).

The instructions that are fetched by IFU 602 in a given clock cycle may be referred to as a fetch group, with the fetch group including any number of instructions, depending on the embodiment. The branch predictor 606 may use one or more branch prediction tables and mechanisms for determining a next fetch program counter sooner than the branch target address is resolved. In various embodiments, the predicted address is verified later in the pipeline by comparison to an address computed by the execution unit(s) 626. For the RAS 608, the predicted return address is verified when a return address (branch target address) is retrieved from a copy of the memory stack stored in the data cache via the LSU 624 and the cache interface 628.

In various embodiments, predictions occur at the granularity of fetch groups (which include multiple instructions). In other embodiments, predictions occur at the granularity of individual instructions. In the case of a misprediction, the front-end of pipeline stages of processor 600 may be flushed and fetches may be restarted at the new address.

IFU 602 conveys fetched instruction data to decode unit 610. In one embodiment, decode unit 610 may be configured to prepare fetched instructions for further processing. Decode unit 610 may be configured to identify the particular nature of an instruction (e.g., as specified by its opcode) and to determine the source and destination registers encoded in an instruction, if any. Map unit 612 may be configured to map the decoded instructions (or uops) to physical registers within processor 600. Map unit 612 may also implement register renaming to map source register addresses from the uops to the source operand numbers identifying the renamed source registers. Dispatch unit 618 may be configured to dispatch uops to reservation stations (not shown) within the various execution units.

Issue unit 620 may be configured to provide instruction sources and data to the various execution units for picked (i.e., scheduled or dispatched) instructions. In one embodiment, issue unit 620 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, processor 600 includes a working register file 630 that may be configured to store instruction results (e.g., integer results, floating-point results, and/or condition signature results) that have not yet been committed to architectural state, and which may serve as the source for certain operands. The various execution units may also maintain architectural integer, floating-point, and condition signature state from which operands may be sourced.

Instructions issued from issue unit 620 may proceed to one or more of the illustrated execution units to be performed. In one embodiment, each of execution unit(s) 626 is similarly or identically configured to perform certain integer-type instructions defined in the implemented ISA, such as arithmetic, logical, and shift instructions. In some embodiments, architectural and non-architectural register files are physically implemented within or near execution unit(s) 626. It is contemplated that in some embodiments, processor 600 may include any number of integer execution units, and the execution units may or may not be symmetric in functionality.

Load store unit (LSU) 624 may be configured to process data memory references, such as integer and floating-point load and store instructions and other types of memory reference instructions. LSU 624 may include a data cache (not shown) as well as logic configured to detect data cache misses and to responsively request data from a cache or memory through cache/memory interface 628. In one embodiment, a data cache in LSU 624 may be configured as a set-associative, write-through cache in which all stores are written to a higher-level (e.g., L2) cache regardless of whether they hit in the data cache.

In various embodiments, LSU 624 may implement a variety of structures configured to facilitate memory operations. For example, LSU 624 may implement a data TLB to cache virtual data address translations, as well as load and store buffers configured to store issued but not-yet-committed load and store instructions for the purposes of coherency snooping and dependency checking. LSU 624 may include a miss buffer configured to store outstanding loads and stores that cannot yet complete, for example due to cache misses. In one embodiment, LSU 624 may implement a store queue configured to store address and data information for stores that have committed, in order to facilitate load dependency checking. LSU 624 may also include hardware configured to support atomic load-store instructions, memory-related exception detection, and read and write access to special-purpose registers (e.g., control registers).

Floating-point/graphics unit (FGU) 622 may be configured to perform and provide results for certain floating-point and graphics-oriented instructions defined in the implemented ISA. For example, in one embodiment FGU 622 implements single-precision and double-precision floating-point arithmetic instructions compliant with the IEEE floating-point standards, such as add, subtract, multiply, divide, and certain transcendental functions.

In the illustrated embodiment, completion unit 614 includes reorder buffer (ROB) 616 and coordinates transfer of speculative results into the architectural state of processor 600. Entries in ROB 616 may be allocated in program order. Completion unit 614 may include other elements for handling completion/retirement of instructions and/or storing history including register values, etc. In some embodiments, speculative results of instructions may be stored in ROB 616 before being committed to the architectural state of processor 600, and confirmed results may be committed in program order. Entries in ROB 616 may be marked as completed when their results are allowed to be written to the architectural state. Completion unit 614 may also be configured to coordinate instruction flushing and/or replaying of instructions.

In various embodiments, when the decode unit 610 determines a procedure call for a subroutine occurs in the instructions of the software application, an indication is sent down the pipeline to the authenticator 640 for generating a cryptographic signature for the associated return address. The authenticator 640 uses one of a variety of cryptographic algorithms. For example, in some embodiments, the authenticator 640 uses one of many variations of the relatively low-latency block cipher PRINCE algorithm. In some embodiments, the authenticator 640 uses some logic in the FPGU 622. In other embodiments, the authenticator 640 uses only logic within itself. One or more keys stored in secure memory, the return address, and possibly one or more other values as selected by designers are used as inputs to the cryptographic algorithm.

In various embodiments, the procedure call is not completed until the signature is generated by the authenticator 640. In various embodiments, the signature and the return address are stored together as a unit to provide a value for the branch target address. In some embodiments, the signature and the return address are concatenated. In various embodiments, a first copy of the concatenated signature and return address is stored in the RAS 608 while a second copy is stored in the memory stack provided by the operating system. The second copy is sent to the data cache via the LSU 624 and the cache interface 628. Storing each of the first copy and the second copy may be referred to as "pushing" the return address.

In various embodiments, when the decode unit 610 determines a procedure return corresponding to the earlier procedure call occurs in the instructions of the software application, an indication is sent down the pipeline to the authenticator 640 for regenerating the cryptographic signature for the associated return address. Additionally, the RAS 608 receives an indication, such as the PC register value, to provide the predicted return address. Further, the LSU 624 receives a load instruction for reading the copy of the branch target address stored in memory such as the memory stack provided by the operating system.

In various embodiments, the RAS 608 provides a predicted branch target address for instruction fetching before the LSU 624 completes or the authenticator 640 has even started let alone completes. In one example, the RAS 608 provides the predicted branch target address in one clock cycle to the instruction fetch unit 602. In some embodiments, the RAS 608 also stores the cryptographic signature along with the predicted return address. In other embodiments, the cryptographic signature is stored separately in a software-invisible hardware register.

The instruction fetch unit 602 begins fetching instructions stored in memory locations pointed to by the received return address prior to the authenticator 640 completes. Although instruction processing continues while authentication is being performed, the register indirect branch (jump) instruction corresponding to the procedure return is not permitted to commit. As the pipeline 600 uses in-order commit, no instruction commits before authentication completes although the instructions are processing.

When the LSU 624 receives the copy of the cryptographic signature and the return address from the data cache via the interface 628, the copy of the return address is compared with the copy of the return address supplied earlier by the RAS 608. If a mismatch is found, then branch misprediction recovery is performed. Otherwise, the instruction processing continues. In some embodiments, the authenticator 640 begins regenerating the signature based on the copy of the return address from the RAS 608. In other embodiments, the authenticator 640 begins regenerating the signature based on the copy of the return address from the LSU 624.

When authenticator 640 completes regenerating the cryptographic signature, this value is compared to one or more of the copies of the signature retrieved earlier from the RAS 608 and the LSU 624. If the compared values match, instruction processing continues and the register indirect jump instruction is permitted to commit. If a mismatch is found during the one or more comparisons of the copies of the signature, then an exception is generated and processor execution halts with no instruction or state committed. Therefore, security is provided without impacting performance during the procedure return.

Figure 7:
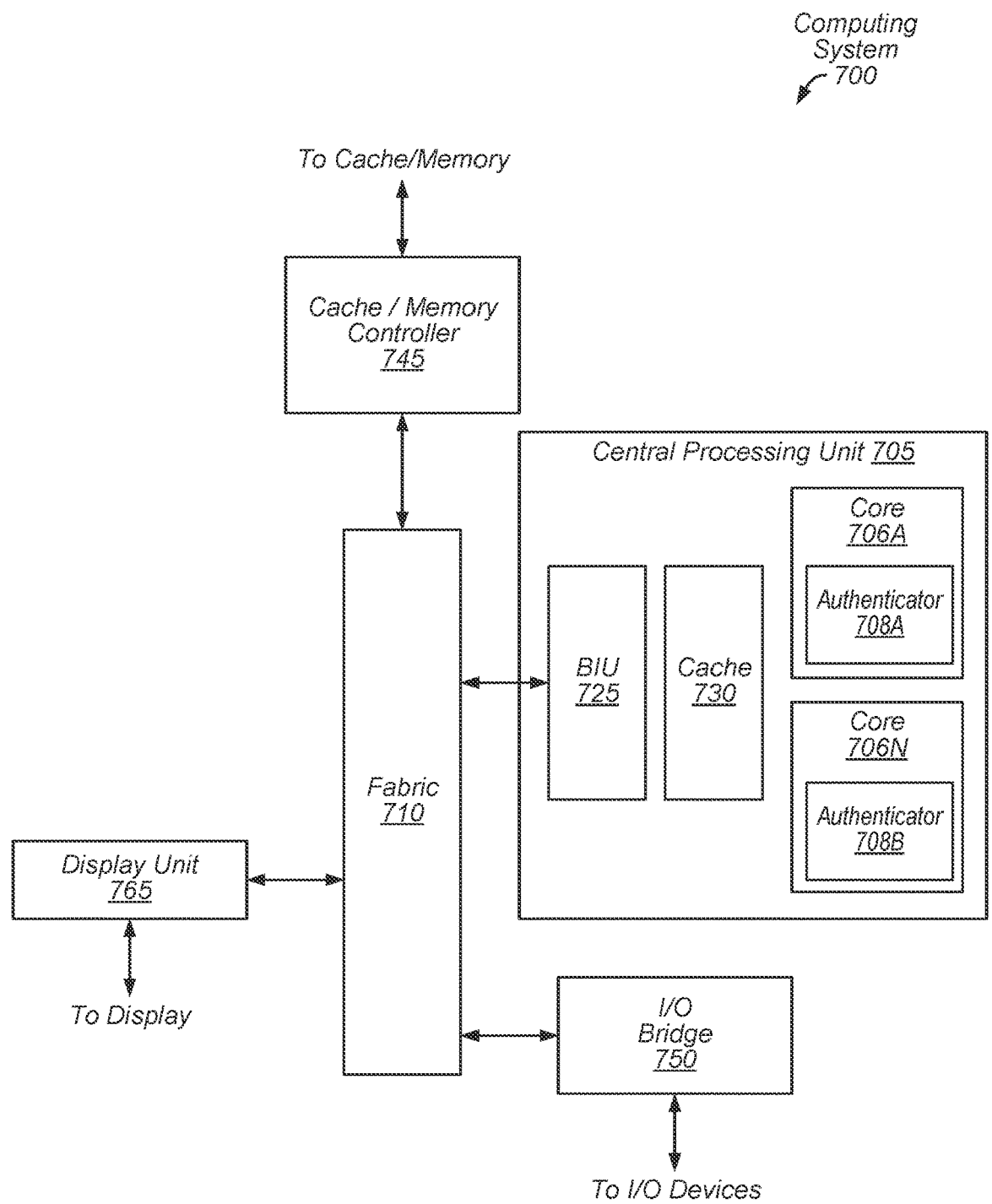
FIG. 7 is a block diagram of another embodiment of a computing system.

Referring now to FIG. 7, a block diagram illustrating one embodiment of a computing system 700 is shown. In some embodiments, some or all elements of the computing system 700 may be included within a system on a chip (SoC). In some embodiments, computing system 700 may be included in a mobile device. In the illustrated embodiment, the computing system 700 includes fabric 710, central processing unit (CPU) 705, input/output (I/O) bridge 750, cache/memory controller 745, and display unit 765. Although the computing system 700 illustrates central processing unit 705 as being connected to fabric 710 as a sole central processing unit of the computing system 700, in other embodiments, central processing unit 705 may be connected to or included in other components of the computing system 700. Additionally or alternatively, the computing system 700 may include multiple central processing units 705. The multiple central processing units 705 may include different units or equivalent units, depending on the embodiment.

Fabric 710 may include various interconnects, buses, MUXes, controllers, etc., and may be configured to facilitate communication between various elements of computing system 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, central processing unit 705 includes bus interface unit (BIU) 725, cache 730, and cores 706A and 706N. In various embodiments, central processing unit 705 may include various numbers of cores and/or caches. For example, central processing unit 705 may include 1, 2, or 4 processor cores, or any other suitable number. In some embodiments, cores 706A and/or 706N include internal instruction and/or data caches. In various embodiments, cores 706A and 706N include respective authenticators 708A and 708N. Authenticators 708A and 708N may be used to provide security for procedure returns while not increasing latency when no attacks are found. In some embodiments, a coherency unit (not shown) in fabric 710, cache 730, or elsewhere in computing system 700 may be configured to maintain coherency between various caches of computing system 700. BIU 725 may be configured to manage communication between central processing unit 705 and other elements of computing system 700. Processor cores such as cores 706A and 706N may be configured to execute instructions of a particular instruction set architecture (ISA), which may include operating system instructions and user application instructions.

Cache/memory controller 745 may be configured to manage transfer of data between fabric 710 and one or more caches and/or memories (e.g., non-transitory computer readable mediums). For example, cache/memory controller 745 may be coupled to an L3 cache, which may, in turn, be coupled to a system memory. In other embodiments, cache/memory controller 745 may be directly coupled to a memory. In some embodiments, the cache/memory controller 745 may include one or more internal caches.

Display unit 765 may be configured to read data from a frame buffer and provide a stream of pixel values for display. Display unit 765 may be configured as a display pipeline in some embodiments. Furthermore, display unit 765 may include one or more interfaces (e.g., MIPI® or embedded display port (eDP)) for coupling to a user display (e.g., a touchscreen or an external display). I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 700 via I/O bridge 750. In some embodiments, central processing unit 705 may be coupled to computing system 700 via I/O bridge 750.

It is noted that other embodiments may include other combinations of components, including subsets or supersets of the components shown in FIG. 7 and/or other components. While one instance of a given component may be shown in FIG. 7, other embodiments may include two or more instances of the given component. Similarly, throughout this detailed description, two or more instances of a given component may be included even if only one is shown, and/or embodiments that include only one instance may be used even if multiple instances are shown.

Figure 8:
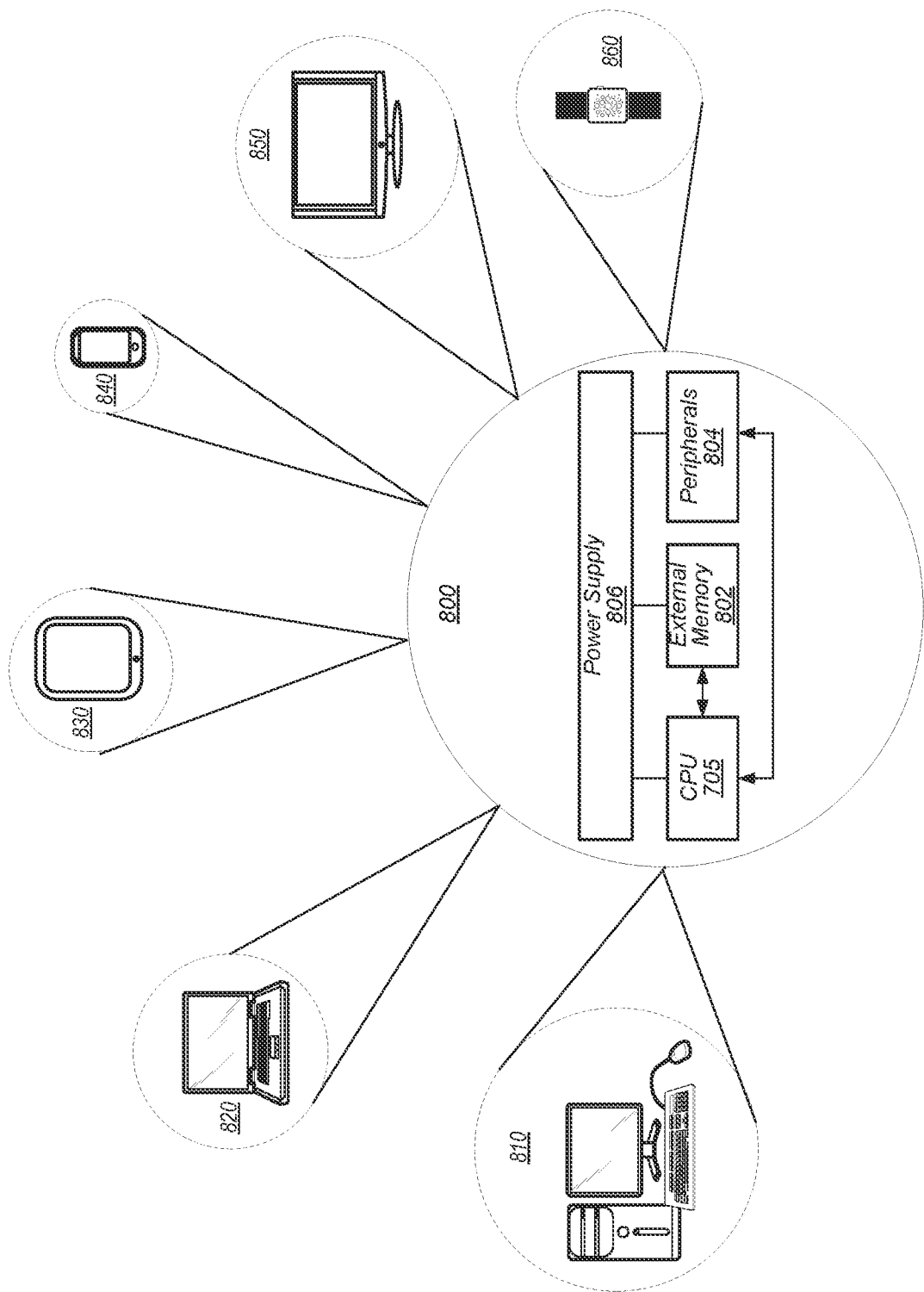
FIG. 8 is a block diagram illustrating one embodiment of a system.

Turning next to FIG. 8, a block diagram of one embodiment of a system 600 is shown. As shown, system 800 may represent chip, circuitry, components, etc., of a desktop computer 810, laptop computer 820, tablet computer 830, cell or mobile phone 840, television 850 (or set top box configured to be coupled to a television), wrist watch or other wearable item 860, or otherwise. Other devices are possible and are contemplated. In the illustrated embodiment, the system 800 includes at least one instance of CPU 705 (of FIG. 7) coupled to an external memory 802. In various embodiments, CPU 705 may be included within a system on chip (SoC) or integrated circuit (IC) which is coupled to external memory 802, peripherals 804, and power supply 806.

CPU 705 is coupled to one or more peripherals 804 and the external memory 802. A power supply 806 is also provided which supplies the supply voltages to CPU 705 as well as one or more supply voltages to the memory 802 and/or the peripherals 804. In various embodiments, power supply 806 may represent a battery (e.g., a rechargeable battery in a smart phone, laptop or tablet computer). In some embodiments, more than one instance of CPU 705 may be included (and more than one external memory 802 may be included as well).

The memory 802 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing CPU 705 in a chip-on-chip configuration, a package-on-package configuration, or a multi-chip module configuration.

The peripherals 804 may include any desired circuitry, depending on the type of system 800. For example, in one embodiment, peripherals 804 may include devices for various types of wireless communication, such as Wi-Fi, Bluetooth, cellular, global positioning system, etc. The peripherals 804 may also include additional storage, including RAM storage, solid state storage, or disk storage. The peripherals 804 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor, comprising:
an execution core comprising an authentication circuit and configured to:
generate, prior to completing execution of a fetched call instruction, a signature to be used for authenticating a return address of a subroutine identified by the call instruction;
store, in a data storage location, a concatenation of the return address of the subroutine and the signature; and
transfer control of a computer program to the subroutine, based at least in part on a determination that execution of the call instruction has completed.

2. The processor as recited in claim 1, wherein the authentication circuit is further configured to store the return address in the data storage location.

3. The processor as recited in claim 2, wherein the authentication circuit is further configured to store the signature in place of a sign extended value of the return address in the data storage location.

4. The processor as recited in claim 3, wherein the data storage location is a location in a return address stack (RAS) of the processor.

5. The processor as recited in claim 3, wherein the data storage location is a location in a link register of the processor.

6. The processor as recited in claim 2, wherein the authentication circuit is further configured to shorten a result of an encryption algorithm to allow the signature to fit in the data storage location with the return address.

7. The processor as recited in claim 6, wherein the authentication circuit is further configured to perform a single pass of an encryption algorithm applied to the return address and at least one cryptographic key to generate the signature.

8. A method, comprising:
fetching, by an instruction cache of a processor, groups of instructions from an instruction cache;
generating, by an execution unit, prior to completing execution of a fetched call instruction, a signature to be used for authenticating a return address of a subroutine identified by the call instruction;
storing, by the execution unit in a data storage location, a concatenation of the return address of the subroutine and the signature; and
transferring control of a computer program, by the execution unit to the subroutine, based at least in part on a determination that execution of the call instruction has completed.

9. The method as recited in claim 8, further comprising storing, by the execution unit, the return address in the data storage location.

10. The method as recited in claim 9, further comprising storing, by the execution unit, the signature in place of a sign extended value of the return address in the data storage location.

11. The method as recited in claim 10, wherein the data storage location is a location in a return address stack (RAS) of the processor.

12. The method as recited in claim 10, wherein the data storage location is a location in a link register of the processor.

13. The method as recited in claim 9, further comprising shortening a result of an encryption algorithm, by the execution unit, to allow the signature to fit in the data storage location with the return address.

14. The method as recited in claim 13, further comprising performing, by the execution unit, a single pass of an encryption algorithm to generate the signature.

15. A computing system, comprising:
an instruction fetch unit configured to fetch groups of instructions from an instruction cache; and
an execution unit configured to:
generate, prior to completing execution of a fetched call instruction, signature to be used for authenticating a return address of a subroutine identified by the call instruction;
store, in a data storage location, a concatenation of the return address of the subroutine and the signature; and
transfer control of a computer program to the subroutine, based at least in part on a determination that execution of the call instruction has completed.

16. The computing system as recited in claim 15, wherein the execution unit is further configured to store the return address in the data storage location.

17. The computing system as recited in claim 16, wherein the execution unit is further configured to store the signature in place of a sign extended value of the return address in the data storage location.

18. The computing system as recited in claim 17, wherein the data storage location is a location in a return address stack (RAS) of the instruction fetch unit.

19. The computing system as recited in claim 17, further comprising a register file, wherein the data storage location is a location in a link register of the register file.

20. The computing system as recited in claim 16, wherein the execution unit is further configured to shorten a result of an encryption algorithm to allow the signature to fit in the data storage location with the return address.

* * * * *